Oct. 29, 1929.  F. A. HOLMES  1,733,347
LUGGAGE CARRIER FOR AUTOMOBILES
Filed Dec. 24, 1928
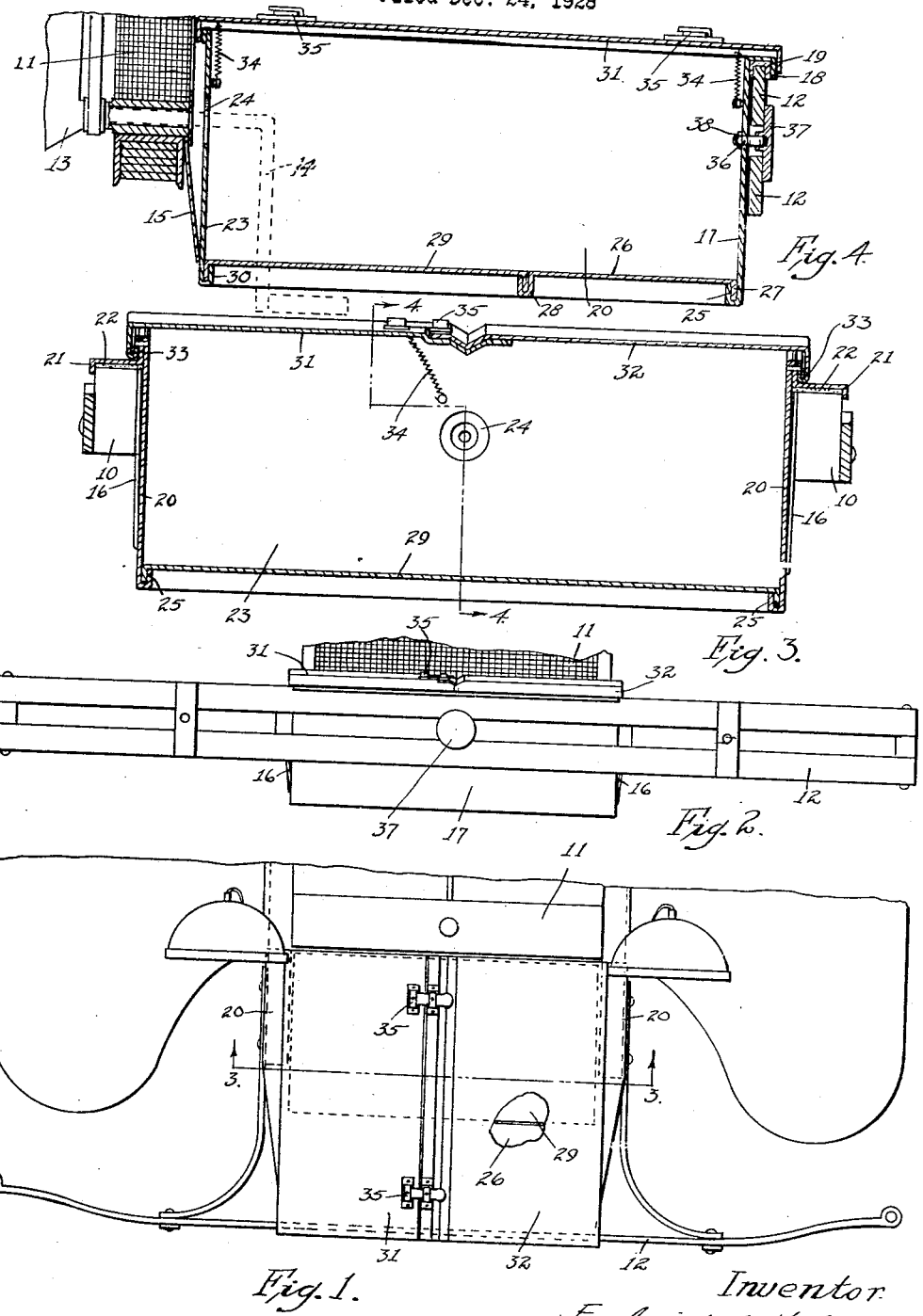
Inventor
Frederick A. Holmes
by Orwig & Hague Atty's.

Patented Oct. 29, 1929

1,733,347

UNITED STATES PATENT OFFICE

FREDERICK A. HOLMES, OF IOWA FALLS, IOWA

LUGGAGE CARRIER FOR AUTOMOBILES

Application filed December 24, 1928. Serial No. 328,277.

The object of my invention is to provide a luggage carrier of simple, durable and inexpensive construction, especially designed to be readily and quickly applied to an automobile at the space in front of the radiator usually occupied by the motor crank.

A further object is to provide a luggage carrier of this class, so constructed and arranged that when necessary the operator may readily, quickly and easily apply a crank to the engine shaft and turn it for starting the engine, without removing the luggage carrier.

A further object is to provide improved and simplified means for detachably connecting the luggage carrier with the automobile frame and front bumper in such manner that it will be securely held in position in such manner that it cannot rattle or become displaced by ordinary shocks or jars to which it might be subjected.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a portion of an automobile with my improved luggage carrier applied thereto.

Figure 2 shows a front elevation of my improved luggage carrier and a part of an automobile radiator and a bumper showing the relative position of the luggage carrier to the bumper and radiator.

Figure 3 shows an enlarged transverse sectional view taken on the line 3—3 of Figure 1; and Figure 4 shows an enlarged, vertical, longitudinal sectional view taken on the line 4—4 of Figure 3.

Referring to the accompanying drawings, I have used the reference numeral 10 to indicate generally the side frame members of an automobile, projecting in front of the radiator, 11 indicates the radiator, 12 the front bumper, 13 a portion of the crank case of the automobile engine, and 14 the engine crank.

Automobiles are usually also provided with a sheet metal shield extending downwardly and inwardly toward the longitudinal center of the automobile from the front ends of the automobile frame, and also extending downwardly and forwardly from the front of the radiator. The latter portion of the shield is indicated by the numeral 15 in Figure 1, and the side members of this shield are indicated by the numeral 16 in Figures 2 and 3. All of the parts just described are of the ordinary construction.

My improved luggage carrier comprises a body portion made of sheet metal and substantially rectangular and of such length as to extend from the shield member 15 at the rear to a point just behind the front bumper 12, and of a width to extend from one frame member to the other. In height it extends from a point substantially even with the lower edge of the shield 15 to a point adjacent to the top of the frame members 10.

From the foregoing it will be seen that my improved luggage carrier does not in any way interfere with the use of the automobile or occupy any space that would make it objectionable or interfere with any of the ordinary uses of the automobile, except in regard to the crank, as will hereinafter appear, and access may be very easily and readily had to the luggage carrier at all times.

The luggage carrier comprises a front sheet metal member indicated by the numeral 17 having its top extended forwardly and then downwardly at 18 with a rubber cushion 19 therein designed to fit on top of the front bumper 12, as shown in Figure 4. The sides are indicated generally by the numeral 20 and at their upper ends they are folded downwardly, then outwardly and then downwardly again at 21, and a rubber cushion 22 is applied to their under surfaces as shown in Figure 3, and this cushion is designed to rest upon the front end of the frame member 10.

The rear member of the luggage carrier is indicated by the numeral 23 and has an opening formed therein at 24 to receive the engine crank.

The lower edges of the front, back and sides are bent first inwardly toward the center of the luggage carrier and then upwardly at 25, as shown in Figures 3 and 4, and are designed to receive the bottom member. The bottom is preferably formed of two parts, the part 26 being the front member and having its front and side edges extended straight downwardly at 27, as shown in Figures 3 and 4, to enter the channels formed by the parts 25. The rear end of the bottom member 26 is bent downwardly, then rearwardly and then upwardly at 28 to form a channel for the rear bottom member 29, which has downwardly extended edges designed to enter the channel 28 and also the channel 30 formed on the lower edge of the rear member 23.

By means of this arrangement it is obvious that if at any time it is necessary to use a crank for the engine, the crank may be inserted through the top of the luggage carrier and through the opening 24 in the rear end of the luggage carrier, and then it may be turned part of a revolution, which is often all that is necessary for cranking purposes.

In the event, however, that is should be necessary to turn the crank through a complete circle, then the operator simply presses upwardly upon the bottom member 29 from below and loosens it and then removes it, and when this is done, the operator can just as conveniently turn the crank through a complete circle as he could if the luggage carrier were not present.

The top of the luggage carrier is preferably formed with two members divided along a central longitudinal line. These members are indicated by the numerals 31 and 32, and they are hinged at their outer edges at 33 to the upper edges of the side members of the luggage carrier.

The inner edges of the top members overlap to a considerable extent, as shown in Figure 3, and both are formed with a V-shaped depression to collect and drain water and prevent it from entering the luggage carrier. In this connection, I preferably make the rear end of the luggage carrier slightly higher than the front, and as shown in Figure 4, so that the water may drain toward the front.

The hinged member 31 is preferably provided with a spring 34 to yieldingly hold it downwardly and prevent rattling and latches 35, of ordinary construction, are provided for holding the two members in locked position.

In applying my improved luggage carrier to an automobile, I place it in position from above, and its rear end will then engage the shield members 15 and 16, and when pressure is applied to the rear end, these shield members will spring outwardly until the luggage carrier has been moved downwardly to the desired position, whereupon the resiliency of these shield members will firmly and securely hold the rear end of the luggage carrier in position and prevent rattling.

The luggage carrier is permanently secured in position by means of a bolt 36 extended through the front of the luggage carrier and between the upper and lower members of the bumper, and secured to the rounded plate 37 in front of the bumper, as shown in Figure 4. Obviously when the nut 38 on the bolt is drawn tight, the entire luggage carrier is immovably held in position.

In practice it is obvious that my improved luggage carrier may be made very cheaply and inexpensively of sheet metal, and that it may be readily, quickly and easily applied to or removed from an automobile without in any way injuring the autotmobile, and without removing any of the automobile parts. By pressing the rear end of the luggage carrier downwardly in position and springing the shield members 15 and 16 outwardly to receive it, it is obvious that the luggage carrier will be securely held against rattling. Hence, only one bolt at the front is necessary to securely hold it in place.

In the event that it should become necessary to use a crank, the operator need only open the front of the luggage carrier and the crank can be applied and used in the ordinary way for a part turn. In some instances, however, it is necessary to give the crank a full circle movement, and when this is necessary, the rear member 29 may be readily and easily removed to allow a full swing of the crank.

The many advantages of having a luggage carrier occupy the space between the radiator and the bumper are obvious.

I claim as my invention:

1. The combination with an automobile having a front bumper and a shield extending downwardly in front of the radiator, of a luggage carrier shaped to enter between the shield and the bumper and to be supported in such position by the shield and bumper.

2. The combination with an automobile having a front bumper and a shield extending downwardly in front of the radiator, of a luggage carrier shaped to enter between the shield and the bumper and to be supported in such position by the shield and bumper; and a bolt for detachably connecting the front of the luggage carrier to the bumper.

3. In combination with an automobile having a front bumper and a shield extending downwardly from the front ends of the automobile frame and forwardly from the front central portion of the automobile frame, and a luggage carrier to enter between the shield and bumper, and so shaped and proportioned that it may be inserted in said space from above, and when pressed downwardly it will spring the side shield downwardly and outwardly and the front shield downwardly and rearwardly, to thereby cause the shield members to yieldingly support the luggage carrier and to prevent it from rattling.

4. The combination with an automobile having a front bumper and a shield extending downwardly in front of the radiator, of a luggage carrier shaped to enter between the shield and the bumper and to be supported in such position by the shield and bumper, the rear member of the luggage carrier being formed with a crank opening, and the bottom of the luggage carrier being provided with a detachable plate, whereby the crank may be inserted through the top of the luggage carrier and through the opening in the rear thereof to connect with the engine crank and to permit full rotation of the crank shaft without removing the luggage carrier.

5. In combination with an automobile having a shield at its front end, a bumper in front of the shield, of a luggage carrier formed of sheet metal substantially rectangular in shape and having side members extended outwardly and then downwardly to engage and rest upon the automobile frame members at the front, a front member formed with a bolt opening, a bolt extended through said opening, a plate at its front to engage the front of the bumper, and a nut at its rear end for adjustment, the rear member being formed with a crank opening, the bottom of the luggage carrier being formed with a detachable bottom member capable of removal upwardly through the luggage carrier, the top member of the luggage carrier composed of two hinge members overlapping at their longitudinal central portions and being formed with a drainage groove in both members, substantially as and for the purposes stated.

Des Moines, Iowa, December 15, 1928.

FREDERICK A. HOLMES.